May 7, 1940.  R. T. QUICK  2,199,651

SEWER SWEEP

Filed July 20, 1937  2 Sheets-Sheet 1

INVENTOR.
Roy T. Quick,
BY Robert W. Fulwider
ATTORNEY.

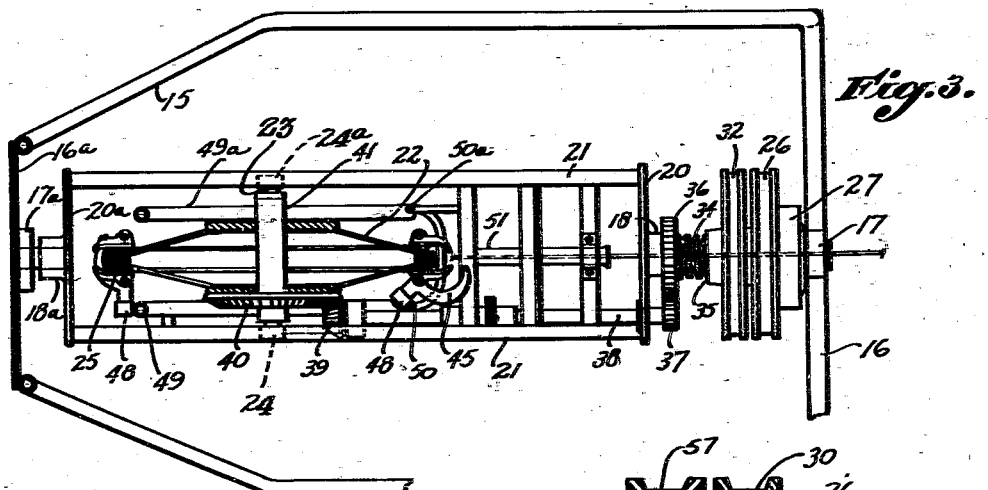
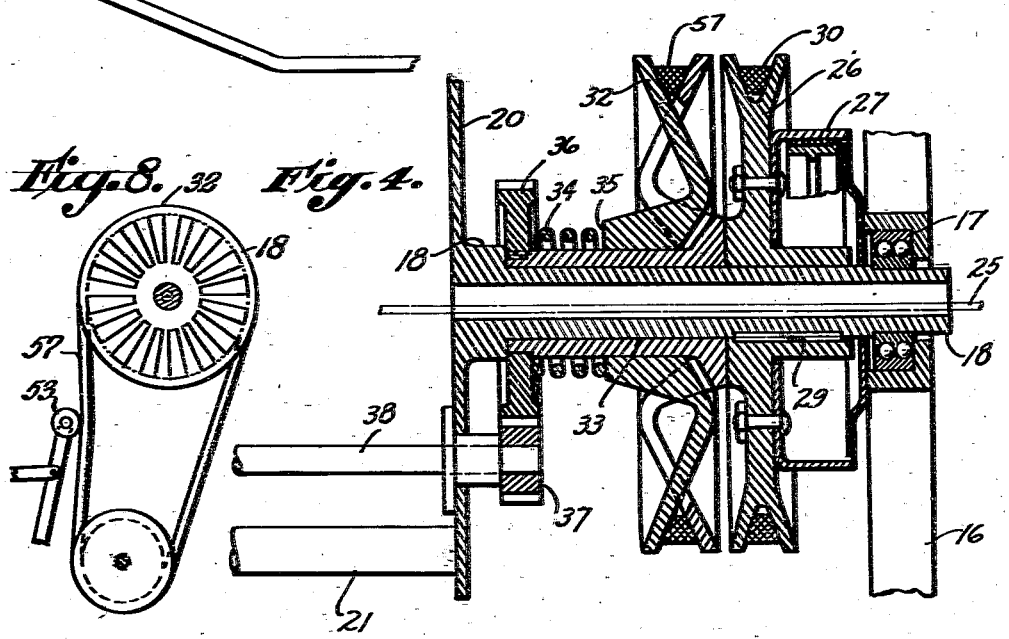
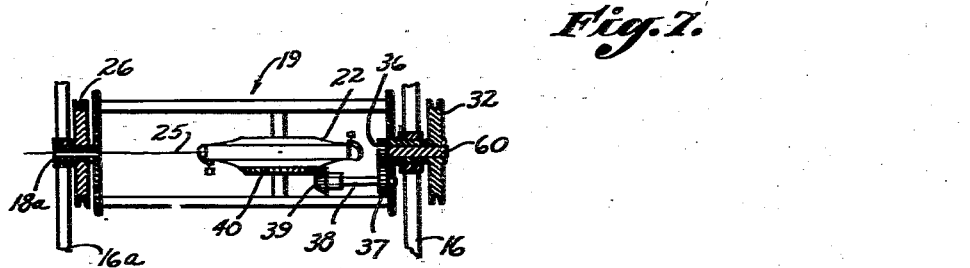

Patented May 7, 1940

2,199,651

UNITED STATES PATENT OFFICE 2,199,651

SEWER SWEEP

Roy T. Quick, Los Angeles, Calif., assignor to George H. Werfelman, Los Angeles, Calif.

Application July 20, 1937, Serial No. 154,622

6 Claims. (Cl. 242—54)

My invention relates broadly to apparatus for cleaning and clearing out pipes of all kinds, and particularly to the cleaning of sewers, drain pipes, and the like.

It is an object of my invention to provide an apparatus which will quickly and successfully remove obstructions and clean pipes where the stoppage is virtually impossible to remove by other known methods and apparatus.

It is a further object of my invention to provide an apparatus of that nature which can handle all types of cleaning jobs and virtually all sizes of pipes where stoppages occur.

It is a well-known fact that many industries such as food-packing plants, breweries, creameries, canneries, laundries, and the like have chronic sewer trouble, and it is the purpose of this invention to provide adequate and simple means for eliminating this condition by providing a simple, durable and economical apparatus which is capable of cleaning all kinds of stoppages from all kinds of sewers.

The apparatus of my invention is of the general type disclosed in the U. S. patent to Magruder, No. 2,075,215 and as will become apparent from the following description of a preferred form of my device, it embodies various novel features and improvements directed toward the facile accomplishment of the before-stated and other objects and advantages.

In the drawings:

Fig. 3 is a plan view corresponding to Fig. 2,

Fig. 4 is an enlarged sectional plan taken on the line 4—4 of Fig. 2,

Fig. 7 is a fragmentary plan of a modified form of my device.

Figure 1:
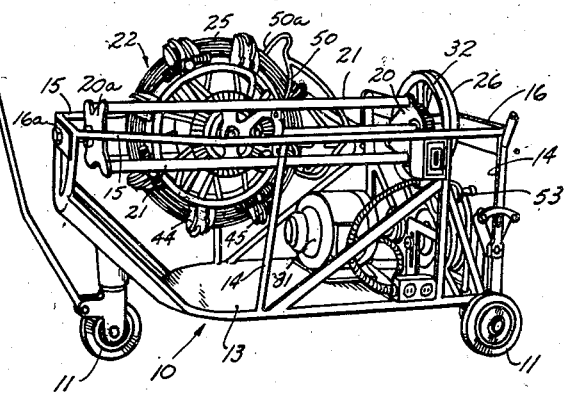
Fig. 1 is a perspective of one preferred form of my complete apparatus.

Referring now to the drawings and particularly to Fig. 1 thereof, the numeral 10 indicates generally a main frame which may be provided with wheels 11 as shown or may be stationary. The frame 10 may conveniently comprise a bed or base plate 13, uprights or posts 14, longitudinal horizontal members 15, and cross-horizontal members or end plates 16 and 16a (see Fig. 3). The end plates 16 and 16a are provided with bearings 17 and 17a in which are journaled the trunnions 18 and 18a of a reel-carriage indicated generally by the numeral 19.

While the construction of the reel-carriage 19 may vary considerably, I have found that a very efficient structure is provided when the carriage is formed of a pair of head plates 20 and 20a and four longitudinally extending rods 21, secured to and between the head plates 20 and 20a, the whole constituting a skeleton framework or carriage 19. A reel 22 is rotatably mounted within the carriage 19 in any convenient manner such as on a shaft 23 extending between side plates or brackets 24 and 24a, fastened between opposed pairs of the longitudinal rods 21.

As mentioned, the carriage 19 is revolubly mounted in the main frame 10 so that we have a condition where the reel 22 is mounted for rotation about its normal axis 23 and is also adapted for revolution about the central axis of carriage 19 which is coincidental with a diameter of the reel 22. As will be explained in detail hereinafter, the reel 22 is adapted to hold a coil of wire 25, upon the free end of which a suitable pipe-cleaning tool (not shown) is fastened, so that rotation of the reel upon its axial shaft 23 will feed the wire from, or wind it upon the reel 22, depending upon the direction of rotation. The revolution of the reel carriage will rotate the wire 25 about its longitudinal axis for the purpose of transmitting a rotary motion to the said pipe-cleaning tool as it is being advanced or retracted in the pipe being cleaned. For flexible operation of my apparatus, it is highly advisable that these two movements of the reel be independent of each other so that they can be individually controlled, and I will now describe in detail my preferred form of accomplishing this function.

As seen best in Fig. 4, the trunnion 18 is somewhat elongated, and appropriate driving means such as a pulley 26 is mounted thereon as by the key 29. The pulley 26 may be connected as by a belt 30, to any suitable source of power such as the shaft of a motor 31 mounted on the bed plate 13, and as will be evident, rotation of the pulley 26 causes rotation of the trunnion 18 and reel-carriage 19. Variable speed means such as a variable diameter pulley 32 with an enlarged hub or sleeve 33 may be rotatably mounted on the trunnion 18 and be provided with suitable spring means 34 adapted to bear on a shoulder 35 of the pulley to continually urge it into its most extended position. The other end of spring 34 preferably bears against a gear 36 keyed to the sleeve 33 so that rotation of the pulley 32 which is driven by a belt 57, from the shaft of motor 31, will cause rotation of the gear 36. A horizontal shaft 38 carrying a gear 37 adapted to mesh with gear 36 is journaled in end plate 20 of the reel carriage 19, and is provided with a beveled pinion 39 on its other end disposed so as to mesh with a beveled ring gear 40 carried by the reel 22. It will, therefore, be seen that I have by very simple means provided independent control means for the revolution of the carriage 19 and the rotation of reel 22 therein, and furthermore that by making the pulley 32 adjustable I am enabled to drive both pulleys from the same source of power and yet vary their relative speeds of rotation.

It will be evident of course that the simplest and most efficient manner of leading the wire 25 into and out of the frame 10 is through one of the trunnions of the carriage 19, and in the preferred form shown in Figs. 1–4, I make the trunnion 18 hollow for this purpose, it being understood of course that the trunnion 18a could just as well be made hollow and the wire led through it instead of trunnion 18, without necessitating any change in the other mechanism described.

Figure 2:
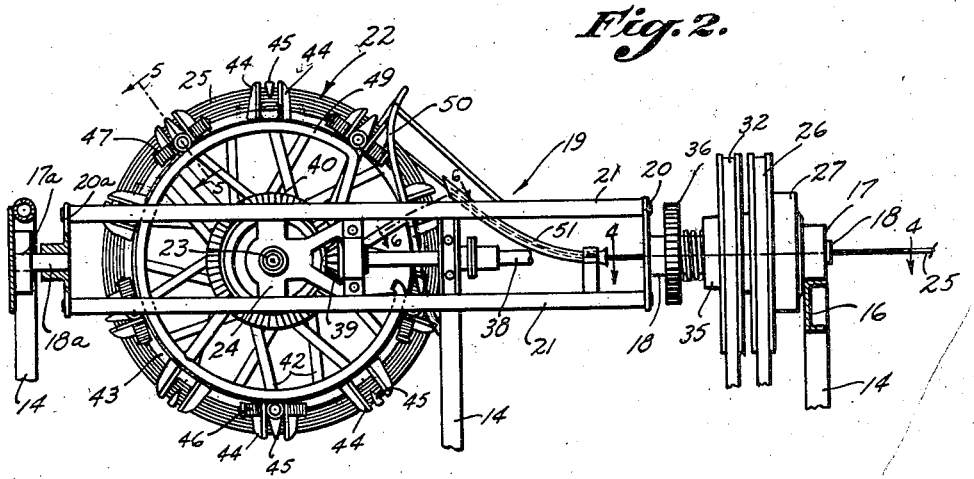
Fig. 2 is a side elevation of the main working parts thereof.
Figure 5:
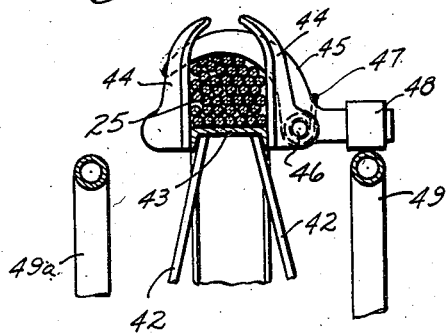
Fig. 5 is fragmentary elevation taken at 5—5 of Fig. 2, showing the clamping fingers in closed position.
Figure 6:
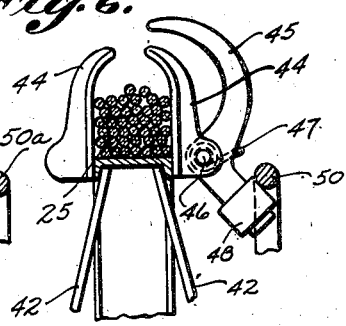
Fig. 6 is a view similar to Fig. 5, but taken at 6—6 in Fig. 2 where the fingers are in open position.

Referring now particularly to Figs. 2 and 3, it will be seen that the reel 22 comprises a hub 41, spokes 42, and rim 43, and in addition thereto is provided with a series of radial lugs 44 arranged in pairs on each side of the rim adapted to form a housing or receptacle for the coiled wire 25, preventing it from sliding off of the rim. When the reel is rotated at high speed there is, of course, considerable force tending to throw the wire off the reel and likewise if the wire is being fed into a pipe against obstructions, the resistance to the forward motion of the tool in the pipe tends to force the wire up and off of the rim 43. To meet these conditions, I provide a series of resiliently mounted clamping fingers 45, preferably one between each pair of radial lugs. Each finger 45 as best seen in Figs. 5 and 6 is curved to generally conform to the outline of the wire on the reel 22, so that when the finger is in closed or clamping position as shown in Fig. 5 the wire is firmly held against the rim 43. Alternate fingers 45 are pivotally mounted on opposite sides of the rim 43 preferably on pins 46 surrounded by springs 47 which continually urge and retain the fingers in closed or normal position.

Each finger is provided with an outwardly extending arm which carries a cam roller 48 adapted to ride on a circular cam-retaining track, to prevent the finger from opening. Two cam retaining tracks are provided, numbered 49 and 49a, one for the cam rollers extending from one side of the rim and the other for the cam rollers on the alternate fingers which extend from the other side of the rim. By this means a positive lock is provided for each finger, preventing it from opening beyond a certain point even though the spring 47 should fail. As seen best in Fig. 2 the tracks 49 are not full circles, but have an open segment facing the end of the carriage from which the wire is to be led, and consequently when the fingers reach the end of the track 49 in their travel they are free to pivot about the pin 46 until the cam roller 48 again engages the track 49. If it is desired to have the fingers 45 locked in all positions, i. e., for various amounts of wire on the reel, the cam-retaining tracks 49 may be resiliently mounted in any suitable manner to continually urge the fingers against the rim 43. For example, the track may be formed of a relatively thin flexible band expansibly mounted on a plurality of segmental shoes which are resiliently mounted on the carriage 19, appropriate spring means being provided to normally urge them radially outward.

Obviously the wire 25 cannot be unwound from the reel unless the fingers 45 are opened, and to accomplish this function I provide camming rods 50 and 50a, mounted on the carriage 19 and extending downwardly on either side of the reel rim 43 in such a position as to be engaged by the cam rollers 48, which, as they travel along the camming rods are depressed and thus raise the fingers 45 against the action of the springs 47 to open position, allowing the wire 25 to pass from the reel 22 out through appropriate means such as tube 51 to the hollow trunnion 18. As seen best in Fig. 2, the camming rods 50 and 50a engage the cam rollers 48 almost immediately after the latter are released by the tracks 49 and 49a respectively, and terminate just short of the other end of the tracks so that after the fingers pass the point where the wire leaves the reel they are allowed to be closed by the springs 47 and then locked by subsequent engagement with the tracks 49 and 49a respectively.

The operation of my preferred form of apparatus is as follows:

A cleaning tool of suitable form is fastened to the free end of the wire 25 extending beyond the machine, the power source is energized, and by reason of belts 30 and 57 the pulleys 26 and 32 are caused to rotate. The pulley 26 keyed to trunnion 18 causes the reel-carriage 19 to revolve, and the pulley 32 causes rotation of sleeve 33 and gear 36 about the axis of trunnion 18. As long as the speeds of rotation of the two pulleys 26 and 32 are the same, there will be no relative motion of the gear 36 with respect to either the trunnion 18 or the gear 37 carried by shaft 38 in the reel-carriage 19. If it is desired to pay out the wire and feed it into a pipe to be cleaned, the speed of the pulley 32 is increased by placing increased tension on the belt 57 by any convenient means such as an idler pulley 53 which causes the adjustable sheave to spread out against the force of spring 34 thus reducing the diameter of the pulley 32 and decreasing the ratio between it and the driving pulley on the motor shaft. This increase in speed of pulley 32 and its attached gear 36 causes the gear 37 to rotate, which in turn causes the reel 22 to rotate about its normal axis 23 to pay out the wire 25 which passes through guiding tube 51 and hollow trunnion 18 to the pipe being cleaned. Alternative means for placing tension on the belt is to provide a variable sheave pulley on the drive shaft also and to vary its diameter manually to vary the belt tension and hence the speed of pulley 32.

When it is desired to withdraw the wire 25 from the pipe being cleaned and rewind it on reel 22, the speed of pulley 32 is decreased below the speed of the trunnion pulley 26 and relative motion of gear 37 is effected in an opposite direction, causing the reel 22 to again rotate on its axis 23 but in a reverse direction.

From the foregoing it will be seen that I have provided simple and accurate means for independently controlling the operations required in the functioning of my apparatus, for by merely varying the position of the idler roller 53, I can control the speed of longitudinal travel of the wire 25 in either direction. If it is also desired to vary the speed of the carriage 19, this can be done in several convenient ways such for example, as providing a rheostat on the motor to control its speed, by using a variable sheave pulley at 26 with an idler pulley such as 53, or by other suitable means. Likewise, if it is desired to rotate the reel 22 to feed the wire 25 without rotating the carriage and wire, suitable clutch means may be provided for entirely disconnecting pulley 26 from trunnion 18 at will.

In the ordinary operation of my device, I have found it highly advisable to revolve the carriage 19 at a relatively high speed, and because of its inertia it will not stop readily upon shutting off the power unless the cleaning tool at the moment is engaged with a stubborn obstruction. Consequently, in the preferred form of my invention, as illustrated herein, I provide the brake 27 on the pulley 26 which can be applied in such manner as to quickly stop further movement of reel-carriage 19 when the power has been shut off.

It will be understood, of course, that the gear connections illustrated herein are merely examples of my preferred form and that variations can be made therein which provide equivalent means for performing the same function. For instance, the gear 36 instead of being constructed as shown, may be formed as a ring gear with the gear 37 acting as a pinion therefor, and if desired can be made integral with the pulley 32 instead of being separately keyed to the pulley hub or sleeve 33 as shown. Likewise, the gear 37 instead of being fastened directly to shaft 38 can be moved outwardly and connected thereto by a set of bevel gears and an auxiliary shaft disposed transversely of the carriage. It will also be understood that the reel-driving means (pulley 32 and gear 36 in the form shown) need not necessarily be mounted directly on the trunnion 18, but can be supported by the bearing housing or other suitable means and still have its axis of rotation coincidental with that of the trunnion.

In Fig. 7, I have shown a modified form of my apparatus in which both of the carriage trunnions are hollow. The wire 25 is led out through trunnion 18a which has pulley 26 keyed thereon for effecting the revolution of the carriage 19. A shaft 60, which is preferably solid, is rotatably mounted in hollow trunnion 18 and carries pulley 32 keyed to its outer end and gear 36 keyed to its inner end which meshes with gear 37 carried on a shaft 38 as before. In this case gears 36 and 37 are located inside of the carriage 19 but operate the reel in the same manner as previously described. The two pulleys 26 and 32 may be made adjustable and driven from a common power shaft as before described or may be provided with separate motors each equipped with a variable speed control in known manner.

It is to be understood that the forms of my invention shown and described herein are merely illustrative of the principles involved and are not to be taken as limiting the scope thereof to the details shown.

For instance, it will be evident that the bearing 17 may be placed between the pulleys 26 and 32 if it is desired to shorten the length of the unsupported trunnion. Likewise, while I have shown and described pulleys as the most efficient means of driving the respective parts of my apparatus it will be understood that equivalent means such as sprockets, gears, and the like can be used for transmitting power from one shaft to another, and that various equivalent speed varying devices may be used for controlling the relative speeds of the carriage revolving means and the reel rotating means. Consequently, it is intended that the scope of my invention shall be determined by the scope of the appended claims.

I claim as my invention:

1. In pipe cleaning apparatus the combination of: a frame; a revoluble carriage journaled in said frame by means of a pair of trunnions one of which is tubular; means on one of said trunnions for revolving said carriage; a reel rotatably mounted in said carriage on an axis substantially at right angles to that of said carriage, said reel being provided with a plurality of pivoted fingers adapted to hold wire in place on said reel, said fingers being provided with outwardly extending arms; a circular track disposed on said carriage so that said extending arms can ride thereon during the greater portion of their travel to prevent said fingers from opening away from said reel; and means rotatable about one of said trunnions and connected to said reel for causing rotation of said reel on its normal axis.

2. In pipe cleaning apparatus the combination of: a frame; a revoluble carriage journaled in said frame by means of a pair of trunnions one of which is tubular; means on one of said trunnions for revolving said carriage; a reel rotatably mounted in said carriage on an axis substantially at right angles to that of said carriage, said reel being provided with a plurality of pivoted fingers adapted to hold wire in place on said reel, said fingers being provided with outwardly extending arms; a circular track disposed on said carriage so that said extending arms can ride thereon during the greater portion of their travel to prevent said fingers from opening away from said reel; a camming rod mounted on said carriage and adapted to open said fingers during a portion of their travel to allow said wire to leave said reel; and means rotatable about one of said trunnions and connected to said reel for causing rotation of said reel on its normal axis.

3. In pipe cleaning apparatus the combination of: a frame; a revoluble carriage journaled in said frame by means of a pair of trunnions one of which is tubular; a pulley on one of said trunnions adapted to rotate the same and said carriage; a brake adapted to stop the rotation of said carriage; a pulley rotatably mounted on said trunnion and connected to a gear also rotatably mounted on said trunnion; a reel rotatably mounted in said carriage on an axis substantially at right angles to that of said carriage, said reel being provided with a plurality of pivoted fingers adapted to clamp wire on said reel; means mounted on said carriage separate from and nonrotatable with respect to said reel for preventing said fingers from opening until a predetermined point in their path of travel has been reached; a shaft in said carriage, gear-connected to said reel to rotate the same on its normal axis; a gear on the other end of said shaft disposed to mesh with said gear on the trunnion; and means for driving said two pulleys independently of each other to revolve said carriage and rotate said reel in said carriage at variable relative speeds.

4. In pipe cleaning apparatus the combination of: a frame; a revoluble carriage journaled in said frame by means of a pair of trunnions one of which is tubular; a pulley on one of said trunnions adapted to rotate the same and said carriage; a brake adapted to stop the rotation of said carriage; a pulley rotatably mounted on said trunnion and connected to a gear also rotatably mounted on said trunnion; a reel rotatably mounted in said carriage on an axis substantially at right angles to that of said carriage, said reel being provided with a plurality of pivoted fingers adapted to clamp wire on said reel, said fingers having outwardly extending arms; a circular track on said carriage adapted to engage said arms to prevent said fingers from opening during the greater portion of their travel; a shaft in said carriage, gear-connected to said reel to rotate the same on its normal axis; a gear on the other end of said shaft disposed to mesh with said gear on the trunnion; and means for driving said two pulleys independently of each other to revolve said carriage and rotate said reel in said carriage at variable relative speeds.

5. In pipe cleaning apparatus, the combination with a revoluble carriage, a reel rotatable therein and means for revolving said carriage and rotating said reel, of means for holding wire upon said reel comprising a plurality of pivoted fingers adapted to clamp wire on said reel, and means mounted on said carriage separate from and non-rotatable with respect to said reel for preventing said fingers from opening until a predetermined point in their path of travel has been reached.

6. In pipe cleaning apparatus, the combination with a revoluble carriage, a reel rotatable therein and means for revolving said carriage and rotating said reel, of means for holding wire upon said reel comprising a plurality of pivoted fingers adapted to clamp wire on said reel, said fingers having outwardly-extending arms, said carriage being provided with a circular track adapted to engage said arms to prevent said fingers from opening during the greater portion of their travel.

ROY T. QUICK.